United States Patent
Nakagawa et al.

(10) Patent No.: US 10,088,722 B2
(45) Date of Patent: Oct. 2, 2018

(54) DISPLAY PANEL AND DISPLAY APPARATUS WHICH INCLUDE REPAIR WIRING FOR REPAIRING A DISCONNECTION IN LEAD-OUT WIRING

(71) Applicant: Sakai Display Products Corporation, Sakai-shi, Osaka (JP)

(72) Inventors: Hidetoshi Nakagawa, Sakai (JP); Takuya Ohishi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/904,881

(22) PCT Filed: Jul. 10, 2014

(86) PCT No.: PCT/JP2014/068494
§ 371 (c)(1),
(2) Date: Jan. 13, 2016

(87) PCT Pub. No.: WO2015/008696
PCT Pub. Date: Jan. 22, 2015

(65) Prior Publication Data
US 2016/0161814 A1 Jun. 9, 2016

(30) Foreign Application Priority Data
Jul. 19, 2013 (JP) .................................. 2013-150771

(51) Int. Cl.
*G09G 3/36* (2006.01)
*G02F 1/1362* (2006.01)
(Continued)

(52) U.S. Cl.
CPC ...... *G02F 1/136259* (2013.01); *G02F 1/1309* (2013.01); *G02F 1/1345* (2013.01);
(Continued)

(58) Field of Classification Search
CPC ...... G09G 3/36; G09G 3/3688; G09G 3/3648; G02F 1/1345; G02F 1/136259; G02F 1/1309; G02F 1/133345
(Continued)

(56) References Cited

U.S. PATENT DOCUMENTS

| 5,757,450 A | 5/1998 | Fujii et al. |
| 6,380,992 B1 * | 4/2002 | Lee .................. G02F 1/1309 349/152 |

(Continued)

FOREIGN PATENT DOCUMENTS

| JP | H8-76136 A | 3/1996 |
| JP | H10-319438 A | 12/1998 |

(Continued)

OTHER PUBLICATIONS

Office Action for U.S. Appl. No. 14/905,488, dated May 2, 2017, 20 pages.
(Continued)

*Primary Examiner* — Adam J Snyder
(74) *Attorney, Agent, or Firm* — Rudy J. Ng; Bret E. Field; Bozicevic, Field & Francis LLP

(57) ABSTRACT

A display panel which includes a plurality of display elements disposed in a matrix manner, signal input parts to which signals to be supplied to the plurality of display elements are input, and a plurality of signal wirings which connect the plurality of display elements and the signal input parts, wherein at least a part of the signal wirings is provided with a meander wiring part whose wiring is meandered, the display panel including a repair wiring which is disposed so as to intersect the signal wiring in the meander wiring part at at least two locations and an insulation layer which is provided between the signal wiring and the repair wiring.

16 Claims, 13 Drawing Sheets

(51) Int. Cl.
*G02F 1/1345* (2006.01)
*G02F 1/13* (2006.01)
*G02F 1/1333* (2006.01)

(52) U.S. Cl.
CPC ..... *G02F 1/133345* (2013.01); *G09G 3/3648* (2013.01); *G09G 3/3688* (2013.01); *G02F 2001/136263* (2013.01); *G09G 2300/0426* (2013.01); *G09G 2310/08* (2013.01); *G09G 2320/0233* (2013.01); *G09G 2330/08* (2013.01)

(58) Field of Classification Search
USPC .......................................................... 345/87
See application file for complete search history.

(56) References Cited

U.S. PATENT DOCUMENTS

| | | | | |
|---|---|---|---|---|
| 6,856,374 B1* | 2/2005 | Ozaki | ............... | G02F 1/136259 349/192 |
| 7,705,952 B2 | 4/2010 | Lee et al. | | |
| 8,432,506 B2* | 4/2013 | Qian | ............... | G02F 1/1345 349/54 |
| 8,467,027 B2 | 6/2013 | Chang et al. | | |
| 8,848,127 B2* | 9/2014 | Qin | ............... | G02F 1/1309 345/55 |
| 2003/0179158 A1* | 9/2003 | Sakaki | ............... | G02F 1/13452 345/55 |
| 2006/0124966 A1* | 6/2006 | Oh | ............... | G02F 1/1309 257/202 |
| 2007/0080433 A1 | 4/2007 | Lai | | |
| 2007/0216845 A1* | 9/2007 | Liao | ............... | G02F 1/136286 349/149 |
| 2008/0129944 A1 | 6/2008 | Park | | |
| 2008/0143944 A1* | 6/2008 | Chang | ............... | G02F 1/1345 349/139 |
| 2008/0158127 A1* | 7/2008 | Chang | ............... | G02F 1/136259 345/93 |
| 2009/0153764 A1* | 6/2009 | Hsu | ............... | G02F 1/133512 349/54 |
| 2010/0225624 A1 | 9/2010 | Fu et al. | | |
| 2010/0283955 A1 | 11/2010 | Kim et al. | | |
| 2011/0075089 A1 | 3/2011 | Jheng | | |
| 2011/0116215 A1 | 5/2011 | Chang et al. | | |
| 2013/0027624 A1* | 1/2013 | Zhuang | ............... | G02F 1/1345 349/43 |
| 2013/0242511 A1* | 9/2013 | Ohishi | ............... | G02F 1/1345 361/748 |
| 2014/0009714 A1 | 1/2014 | Shim et al. | | |
| 2014/0218653 A1* | 8/2014 | Funahashi | ............... | G02F 1/13458 349/43 |
| 2015/0009438 A1 | 1/2015 | Tezuka et al. | | |
| 2015/0108480 A1* | 4/2015 | Xu | ............... | G02F 1/13452 257/59 |

FOREIGN PATENT DOCUMENTS

| | | | | |
|---|---|---|---|---|
| JP | 2003-005670 A | | 1/2003 | |
| KR | 20040108075 A | * | 12/2004 | ........... G02F 1/1343 |
| KR | 10-0963414 B1 | | 6/2010 | |

OTHER PUBLICATIONS

Notice of Allowance and Fee Due for U.S. Appl. No. 14/905,488, dated Sep. 20, 2017, and.

* cited by examiner

DISPLAY PANEL AND DISPLAY APPARATUS WHICH INCLUDE REPAIR WIRING FOR REPAIRING A DISCONNECTION IN LEAD-OUT WIRING

CROSS-REFERENCE TO RELATED APPLICATIONS

This application is the national phase of PCT International Application No. PCT/JP2014/068494 which has an International filing date of Jul. 10, 2014 and designated the United States of America.

FIELD

The present application relates to a display panel and a display apparatus which include a repair wiring for repairing a disconnection in a lead-out wiring.

BACKGROUND

A liquid crystal display apparatus has been widely used for a computer display, a television receiving apparatus, an information display for displaying various information and the like. For example, an active matrix type liquid crystal display apparatus is configured to serve thin film transistors (TFTs) installed in each pixel as a switching element to apply a signal voltage (gradation voltage) to a pixel electrode within a period in which the switching element is turned on so as to control light transmittance in each pixel, thereby implementing a multi-gradation display with high definition without a crosstalk between the pixels.

Generally, a liquid crystal display panel included in the liquid crystal display apparatus includes two transparent substrates made of a glass thin plate and a liquid crystal sealed between these substrates. One substrate (TFT glass substrate) is provided with the pixel electrode, the TFT, and the like in each pixel, and the other substrate (CF glass substrate) is provided with a color filter facing the pixel electrode and common electrodes (counter electrodes) which are common to each pixel.

The TFT glass substrate is provided with a plurality of gate wirings extending in a horizontal direction, and a plurality of source wirings extending in a vertical direction. Rectangular regions which are partitioned by these gate wirings and source wirings are a pixel region, respectively. Each pixel region is provided with the TFT which is a switching element and the pixel electrode. Further, the liquid crystal display panel includes a gate driver connected to the gate wiring and a source driver connected to the source wiring to control an image display in each pixel.

The source driver outputs display data to each source wiring at a timing synchronized with a data clock signal, within one horizontal synchronizing period. Meanwhile, the gate driver sequentially outputs scanning signals to the gate wirings at a timing synchronized with a gate clock signal, within one vertical synchronizing period. The TFT of the pixel connected to the gate wiring to which the scanning signal is supplied is turned on, and the display data supplied to the source wiring is written in the pixel electrode. Thereby, an orientation of liquid crystal molecules within the pixel is changed, and thus the light transmittance of the pixel is changed. The display data are respectively written in each pixel within one vertical synchronizing period, and a desired image is displayed on the liquid crystal display panel.

SUMMARY

Various display panels including the liquid crystal display panel as described above have a plurality of signal wirings disposed therein to transmit a display signal to be supplied to a display element, and a control signal for driving the display element.

In addition, the display panel is provided with a plurality of signal input parts to which the display signal and the control signal are input on a peripheral edge portion thereof, and is configured to supply the display signal and the control signal input to the signal input parts to each signal wiring through lead-out wirings which connect the signal input parts and the signal wirings.

When a disconnection occurs in such the signal wiring, the display signal and the control signal to be supplied may not be applied to each display element, and an image having an appropriate luminance may not be displayed in the display element for one line which is connected to the corresponding signal wiring, such that unevenness of stripes in the vertical direction and the horizontal direction occur.

In order to repair the above-described disconnection, conventionally, a method in which a dummy wiring is provided along the signal wiring, and when a disconnection occurs at a portion, two locations of the dummy wiring in which the disconnected portion is interposed therebetween become molten so as to provide a bypass path has been proposed (for example, see Japanese Patent Laid-open Publication No. 10-319438).

However, conventionally, it is necessary to dispose the dummy wiring to be overlapped within a line width range of the signal wiring, and when a position in which the dummy wiring is formed is shifted, even if the two locations of the dummy wiring become molten, the bypass path may not be formed. Therefore, there is a problem that the disconnection may not be appropriately rectified. Further, since the dummy wiring is provided along the signal wiring, when repairing the disconnection, it is difficult to view an overlapped portion of conductive layers, and it is not easy to perform a repairing operation.

In consideration of the above-mentioned circumstances, it is an object of the present application to provide a display panel and display apparatus which are capable of reliably repairing a disconnection in a lead-out wiring.

Means for Solving the Problems

A display panel according to the present application includes a plurality of display elements disposed in a matrix manner, signal input parts to which signals to be supplied to the plurality of display elements are input, and a plurality of signal wirings which connect the plurality of display elements and the signal input parts, wherein at least a part of the signal wirings is provided with a meander wiring part whose wiring is meandered, the display panel is characterized by including a repair wiring which is disposed so as to intersect the signal wiring in the meander wiring part at at least two locations and an insulation layer which is provided between the signal wiring and the repair wiring.

The display panel according to the present application is characterized in that the meander wiring part is provided so that a difference in a resistance value between the plurality of signal wirings becomes a value within a predetermined range.

The display panel according to the present application is characterized in that the repair wiring is disposed so that a partial section thereof is overlapped with the signal wiring in the meander wiring part.

The display panel according to the present application is characterized in that a plurality of repair wirings are provided with respect to one meander wiring part.

The display panel according to the present application is characterized by including a connection wiring part which connects the plurality of repair wirings.

The display panel according to the present application is characterized in that the display element is a liquid crystal display element, and the signal wirings are a source wiring configured to supply a display signal to the liquid crystal display element, and a gate wiring configured to supply a scanning signal for selecting the liquid crystal display element to be supplied with the display signal.

The display panel according to the present application is characterized in that the insulation layer is provided between a source wiring layer including the source wiring and a gate wiring layer including the gate wiring, and at least one of the source wiring layer and the gate wiring layer is provided with the repair wiring.

The display apparatus according to the present application is characterized by including the display panel described above and a driving unit configured to drive the plurality of display elements included in the display panel.

According to the present application, the repair wiring which intersects the wiring of the meander wiring part to be repaired at at least two locations is provided, such that the cross part between the wiring to be repaired and the repair wiring may be easily viewed, and a repair efficiency may be improved.

Further, according to the present application, even if a position in which the repair wiring is formed is slightly shifted in an in-plane direction, the cross parts between the wiring to be repaired and the repair wiring are reliably formed without decreasing an overlapped amount of the wiring to be repaired and the repair wiring, such that a molten-rectifying is executed using these cross parts, and thereby it is possible to repair the disconnection.

The above and further objects and features of the invention will more fully be apparent from the following detailed description with accompanying drawings.

DESCRIPTION OF EMBODIMENTS

Hereinafter, the present application will be described in detail with reference to the accompanying drawings illustrating the embodiments thereof.

Embodiment 1

Figure 1:
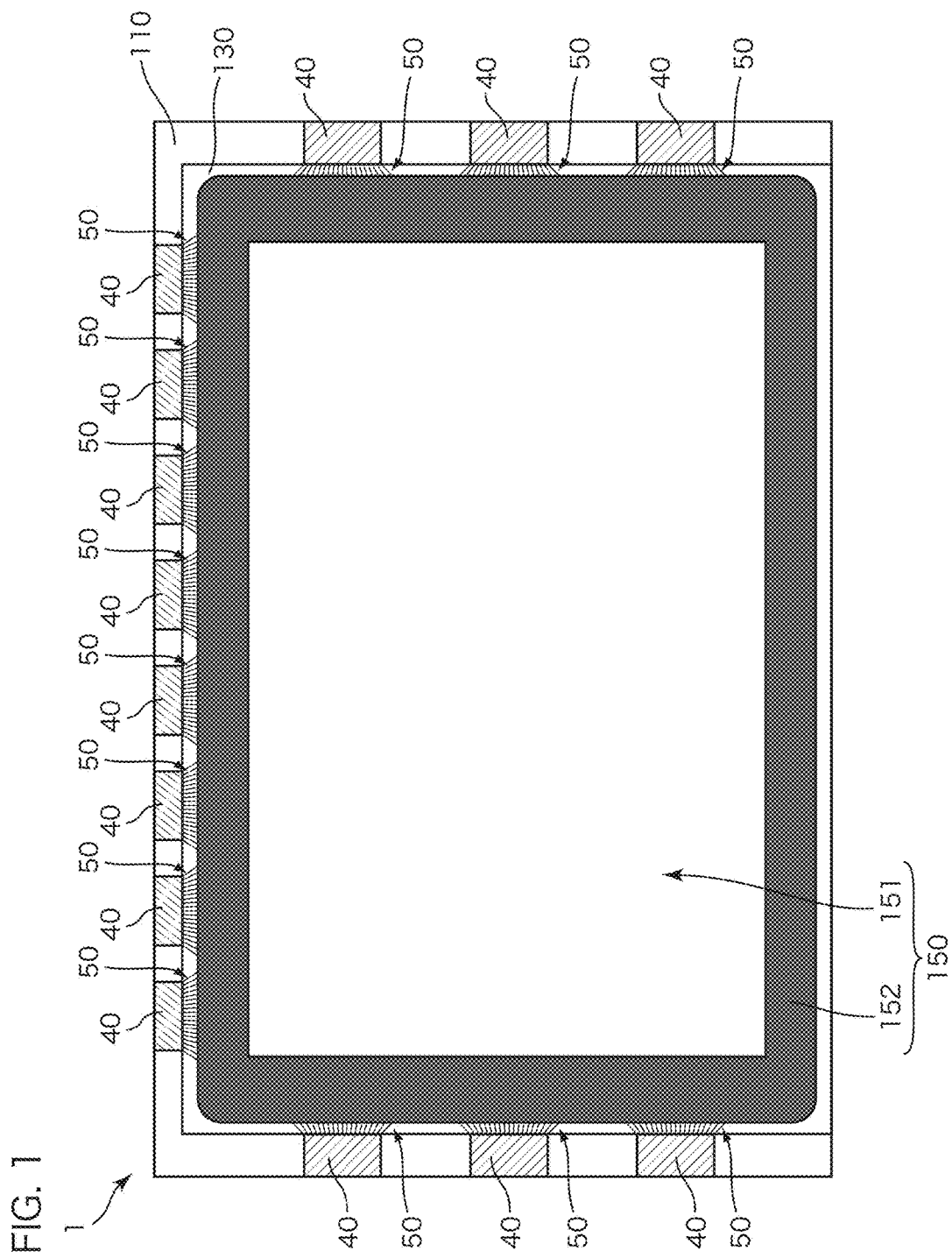
FIG. 1 is a schematic view of a liquid crystal display panel according to an embodiment of the present application.

FIG. 1 is a schematic view of a liquid crystal display panel according to the present embodiment. A liquid crystal display panel 1 according to the present embodiment includes a thin film transistor (TFT) side glass substrate 110, a liquid crystal layer 120 (see FIG. 5), and a color filter (CF) side glass substrate 130.

The TFT side glass substrate 110 is a transparent rectangular substrate, and has a slightly broader cross-section than that of the CF side glass substrate 130. The TFT side glass substrate 110 includes pixel electrodes and TFTs which are formed on one surface thereof corresponding to each of a plurality of display pixels disposed in a matrix manner, for example. In addition, the TFT side glass substrate 110 is provided with signal input parts 40, 40, and . . . on a peripheral edge portion thereof, to which display signals (or scanning signals) to be supplied to each display pixel are input. Also, the TFT side glass substrate 110 is provided with a wiring layer including signal wirings such as gate wirings 21, and source wirings 31 (see FIG. 2).

The display signals to be supplied to each of the display pixels, for example, are input to the signal input parts 40, 40, and . . . arranged along an upper side of the liquid crystal display panel 1. Each of the signal input parts 40 is provided with a lead-out wiring part 50, and the display signals are supplied to the appropriate number (for example, 720) of the source wirings 31 through the lead-out wiring part 50.

Similarly, the scanning signals for selecting the display pixels to be supplied with the display signals are input to the signal input parts 40, 40, . . . , which are arranged along a left side or a right side of the liquid crystal display panel 1. Each of the signal input parts 40 is provided with the lead-out wiring part 50, and the scanning signals are supplied to the appropriate number (for example, 360) of the gate wirings 21 through the lead-out wiring part 50.

The CF side glass substrate 130 is a transparent rectangular substrate, and is provided to face one surface of the TFT side glass substrate 110. The CF side glass substrate 130 is provided with counter electrodes 131 (see FIG. 5) on a surface thereof facing the TFT side glass substrate, and is additionally provided with a black matrix 151 for dividing a display region into a lattice-shaped pattern corresponding to each of the display pixels, and a frame part 152 for shielding light in a region around the display region.

The TFT side glass substrate 110 and the CF side glass substrate 130 are bonded to each other by a seal material while being provided with a gap between both substrates, and by sealing a liquid crystal material into the gap, the liquid crystal layer 120 is formed.

Figure 2:
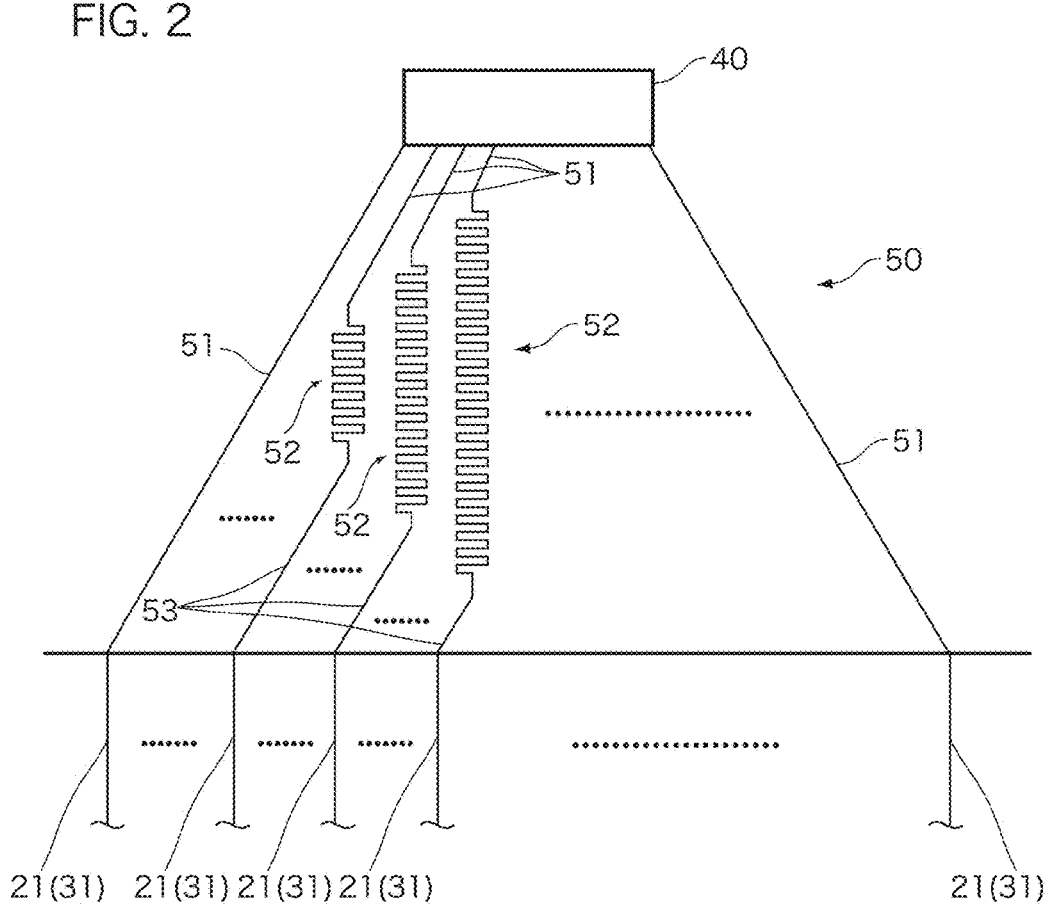
FIG. 2 is a schematic view describing a configuration of a lead-out wiring part.

FIG. 2 is a schematic view describing a configuration of the lead-out wiring part 50. FIG. 2 illustrates only a part of the lead-out wirings, for simplification. In the lead-out wiring part 50, the wirings are lead out from a narrow region on the signal input part 40 side to a wide region on the display region side. Therefore, in the vicinity of a center of the lead-out wiring part 50, a direct distance from the signal input part 40 to the signal wirings (the gate wirings 21 or the source wirings 31) is relatively short, and in the vicinity of end portions of the lead-out wiring part 50, the direct distance from the signal input part 40 to the signal wirings is relatively long. Accordingly, when forming the lead-out wiring in a straight line having the same line width, a resistance value of the lead-out wiring is decreased in the vicinity of the center, and is increased in the vicinity of the end portions thereof. As a result, even when the display signals or scanning signals having the same magnitude are supplied from the signal input parts 40, the magnitudes of signals supplied to respective signal wirings are different from each other depending on wiring lengths of the lead-out wirings to be transmitted. When displaying an image in the display region based on such the signals, a luminance unevenness appears in the displayed image.

In the present embodiment, parts of the lead-out wirings are provided with meander wiring parts 52 whose wirings are meandered, so that a difference in the resistance value between the lead-out wirings becomes within a predetermined range (for example, 10Ω or less). That is, it is configured that the wiring length is lengthened in the vicinity of the center of the lead-out wiring part 50 by increasing the meandering amount in the meander wiring part 52, and the wiring length is adjusted by decreasing the meandering amount from the vicinity of the center toward the end portions to make the wiring lengths of the respective lead-out wirings substantially the same as each other, such that a difference in the resistance values between the lead-out wirings enters within the predetermined range. As illustrated in FIG. 2, the meander wiring parts 52 are provided between straight wiring parts 51 on the signal input part 40 side and straight wiring parts 53 on the display region side.

Figure 3:
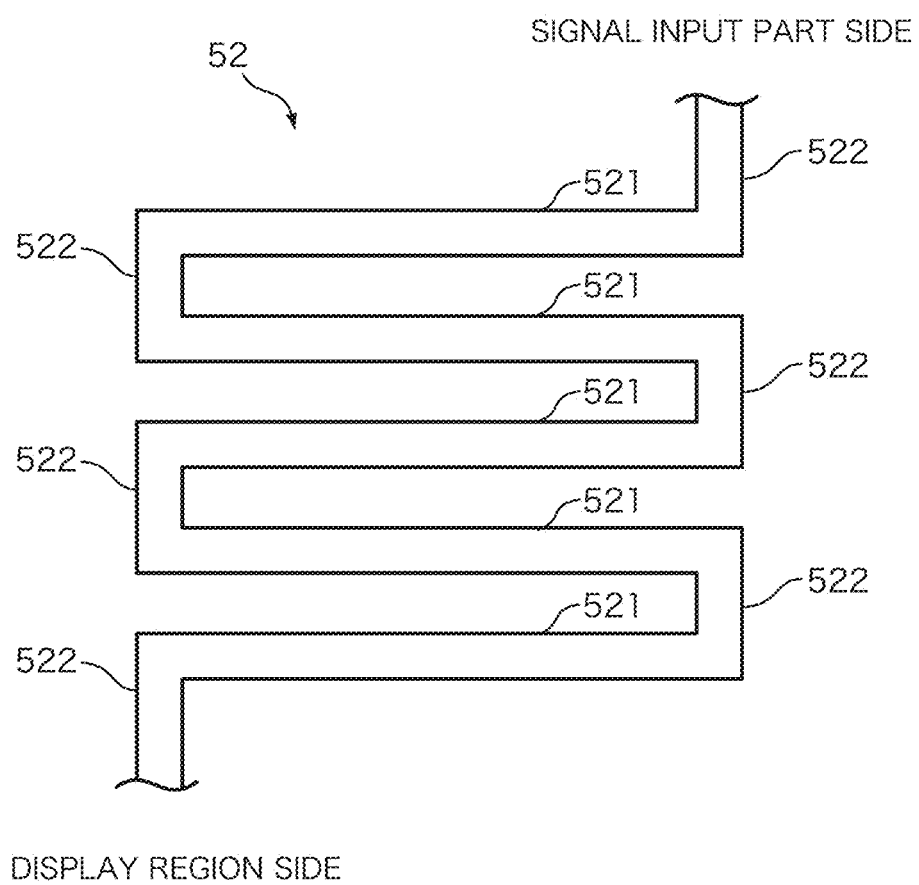
FIG. 3 is a schematic view illustrating an example of a meander wiring part.

FIG. 3 is a schematic view illustrating an example of the meander wiring part 52. The meander wiring part 52 is provided between the straight wiring part 51 connected to the signal input part 40 and the straight wiring part 53 connected to the signal wiring within the display region. The meander wiring part 52 has, for example, cross wirings 521 provided with a length of about 40 μm in a direction intersecting the gate wiring 21 (or the source wiring 31), and parallel wirings 522 provided with a length of about 10 μm in a direction substantially parallel to the gate wiring 21. The meander wiring part 52 is formed by alternately connecting these cross wirings 521 and parallel wirings 522 with each other.

Furthermore, in the present embodiment, the meander wiring part 52 is configured to have the cross wirings 521 intersecting the gate wiring 21 (or the source wiring 31), and the parallel wirings 522 substantially parallel thereto, but a shape of the wiring in the meander wiring part 52 is not limited to the configuration illustrated in FIG. 3. For example, it is not necessary for the cross wirings 521 and the parallel wirings 522 to be orthogonal to each other, and it may be configured to be connected with each other at a prescribed angle. In addition, as illustrated in FIG. 3, it is not necessary to combine the linear wirings, and for example, the meandering wiring may be formed by a combination of the cross wirings 521 and bent wirings having any curvature.

Figure 4:
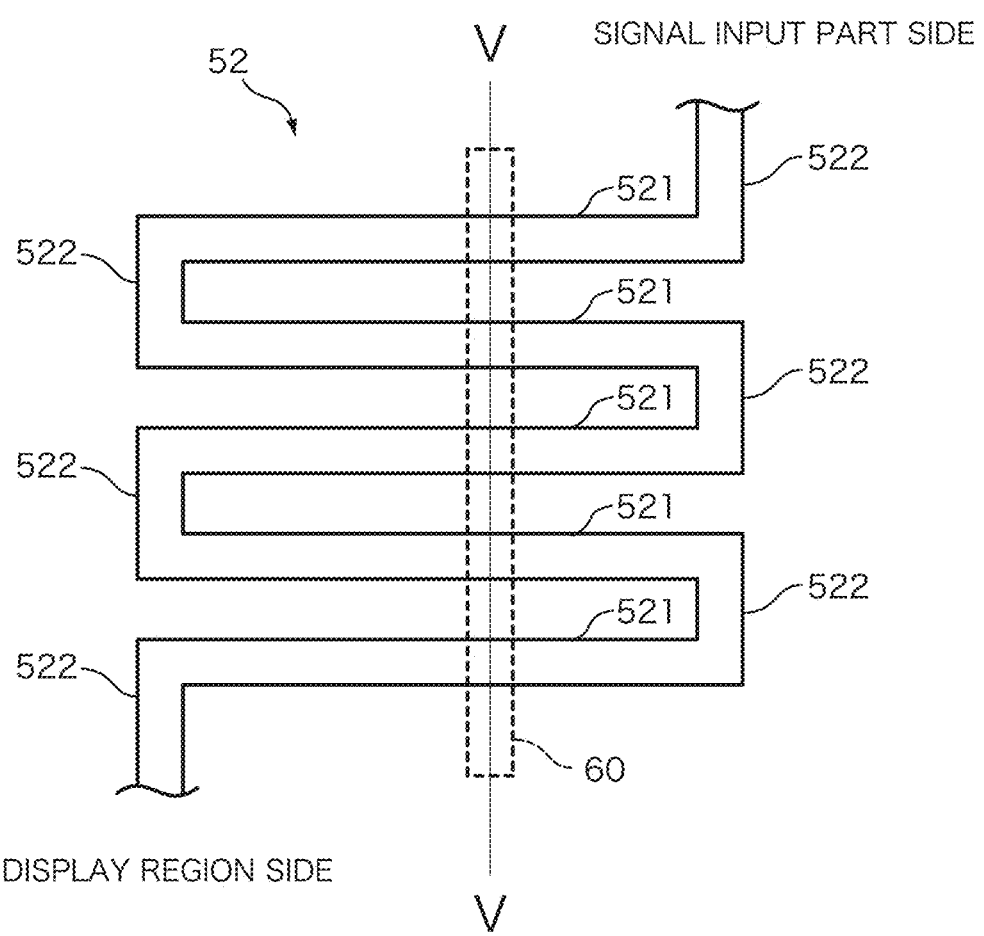
FIG. 4 is a schematic view describing a configuration of a repair wiring in Embodiment 1.

In order to repair a disconnection in the above-described meander wiring part 52, in the present embodiment, a repair wiring 60 is provided. FIG. 4 is a schematic view describing a configuration of the repair wiring 60 in Embodiment 1, and FIG. 5 is a cross-sectional view taken on line V-V in FIG. 4.

The repair wiring 60 is disposed so as to intersect the wiring in the meander wiring part 52 at at least two locations, in a plane view. In the description below, the meander wiring part 52 (lead-out wiring) is connected to the gate wiring 21.

Figure 5:
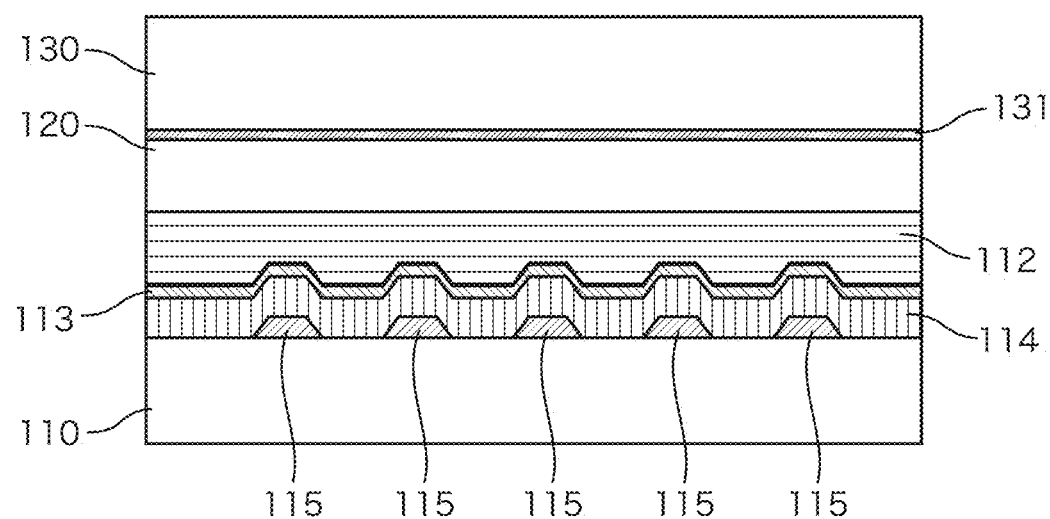
FIG. 5 is a cross-sectional view taken on line V-V in FIG. 4.

As illustrated in FIG. 5, the liquid crystal display panel 1 includes the TFT side glass substrate 110 in which each of the pixels 10 is formed in a matrix manner, a liquid crystal layer 120 formed by sealing the liquid crystal material therein, and the CF side glass substrate 130 in which color filters, and the like are formed. The TFT side glass substrate 110 and the CF side glass substrate 130 are, for example, a glass substrate. Herein, gate wiring layers 115, a gate insulation layer 114, a source wiring layer 113, and a protective layer 112 are laminated on one surface side of the TFT side glass substrate 110. In addition, the counter electrode 131 is formed on one surface side of the CF side glass substrate 130.

The gate insulation layer 114 covers the gate wiring layers 115 forming the gate wirings 21. The meander wiring part 52 (lead-out wiring) connected to the gate wiring 21 may be, for example, made of the same material as the gate wiring 21 by using the same process as the process of forming the gate wiring 21.

The repair wiring 60 may be formed as a wiring in the source wiring layer 113, and may be made, for example, of the same material (for example, Cu/Ti) as the source wiring 31 by using the same process as the process of forming the source wiring 31. That is, the source wiring layer 113 including the repair wiring 60 and the gate wiring layers 115 including the wiring of the meander wiring part 52 to be repaired are laminated with the gate insulation layer 114 interposed therebetween.

Figure 6:
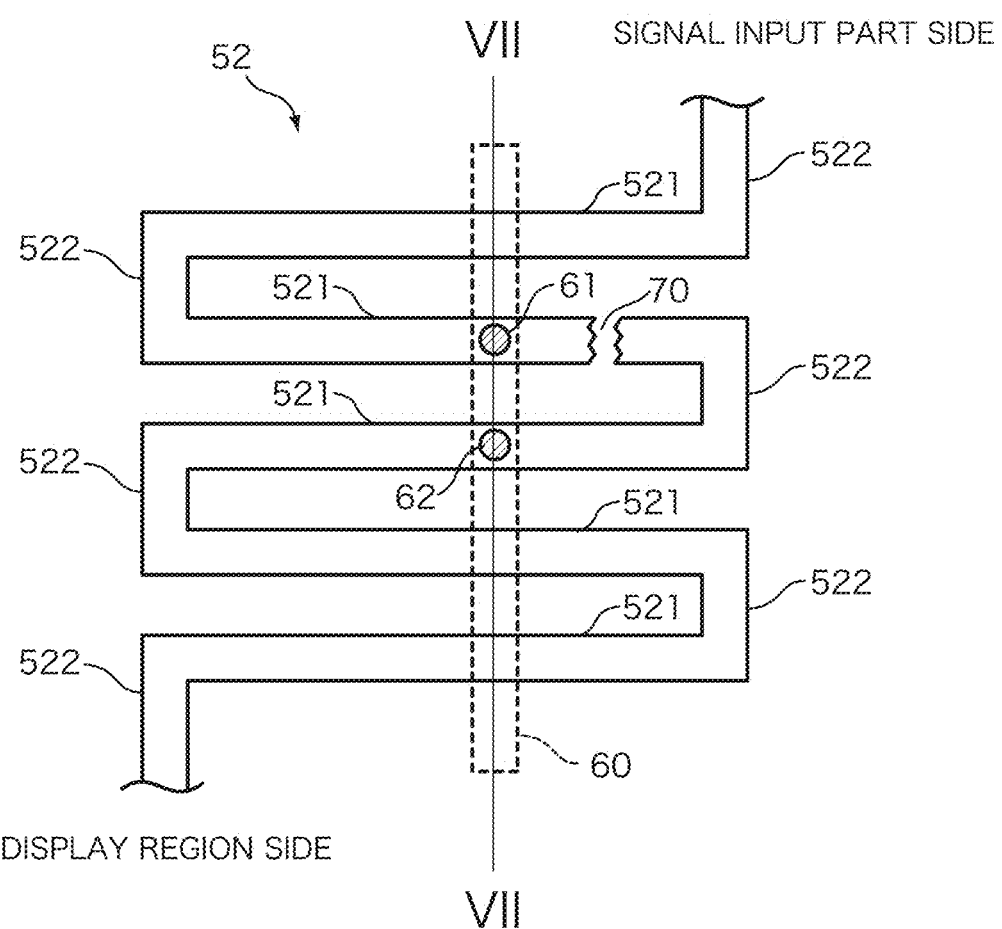
FIG. 6 is a schematic view describing a method for repairing a disconnection.
Figure 7:
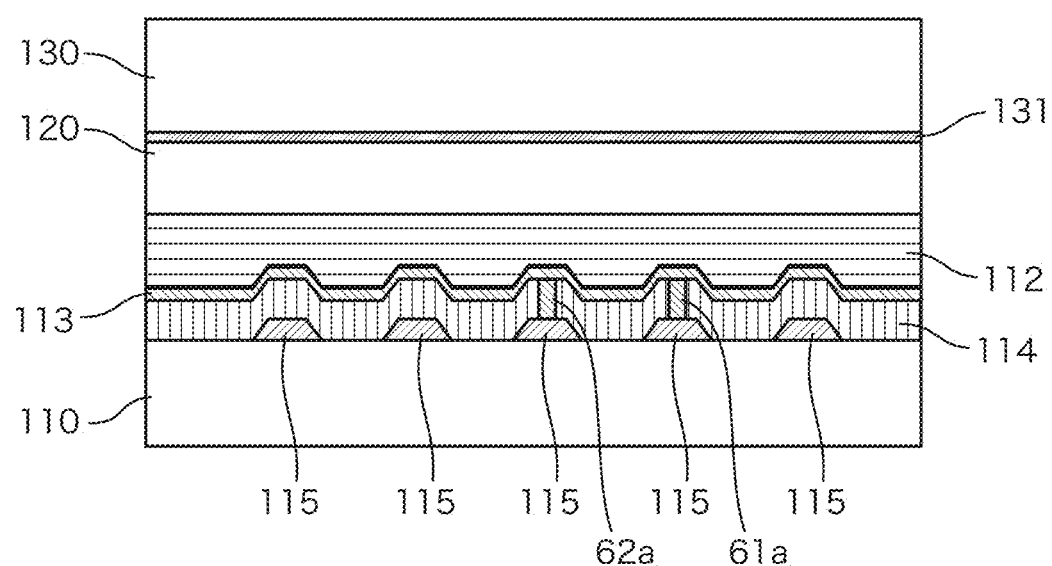
FIG. 7 is a cross-sectional view taken on line VII-VII in FIG. 6.

FIG. 6 is a schematic view describing a method for repairing the disconnection, and FIG. 7 is a cross-sectional view taken on line VII-VII in FIG. 6. Hereinafter, a case in which a disconnection location 70 occurs at one location on the wiring in the meander wiring part 52 will be described. The example illustrated in FIG. 6 shows a state in which the disconnection location 70 occurs at a second cross wiring 521 from the signal input part 40 side. In this case, a cross part 61 between the second cross wiring 521 from the signal input part 40 side and the repair wiring 60, and a cross part 62 between a third cross wiring 521 from the signal input part 40 side and the repair wiring 60 are molten-rectified, and thereby it is possible to provide a bypass path between the second cross wiring 521 and the third cross wiring 521.

Specifically, when the disconnection location 70 occurs at the second cross wiring 521 from the signal input part 40 side, while viewing the cross part 61 between the second cross wiring 521 from the signal input part 40 side and the repair wiring 60 by using a camera and the like, the other surface side of the TFT side glass substrate 110 is irradiated with a laser beam toward the cross part 61, and a part of the repair wiring 60 becomes molten, and thereby a conduction part 61a, in which the repair wiring 60 and the cross wiring 521 located in a lower layer thereof are conducted at the cross part 61, is formed. By the same manner, while viewing the cross part 62 between the third cross wiring 521 from the signal input part 40 side and the repair wiring 60, the other surface side of the TFT side glass substrate 110 is irradiated with a laser beam toward the cross part 62, and a part of the repair wiring 60 becomes molten, and thereby a conduction part 62a, in which the repair wiring 60 and the cross wiring 521 located in the lower layer thereof are conducted at the cross part 62, is formed. Thereby, a bypass path passing through the two cross parts 61 and 62 and the repair wiring 60 may be formed, to repair the disconnection.

As described above, in the present embodiment, the repair wiring 60 intersecting the wiring (lead-out wiring) of the meander wiring part 52 to be repaired at at least two locations is provided, such that the two cross parts 61 and 62 between the lead-out wiring and the repair wiring 60 may be easily viewed, and a repair efficiency may be improved.

Further, in the present embodiment, even when a position in which the repair wiring 60 is formed is slightly shifted in an in-plane direction, the cross part (such as the two cross parts 61 and 62) between the repair wiring 60 and the lead-out wiring is reliably formed without decreasing an overlapped amount of the repair wiring 60 with the lead-out wiring, such that a molten-rectifying is performed using these cross parts (such as the two cross parts 61 and 62), and thereby it is possible to repair the disconnection.

Figure 8:
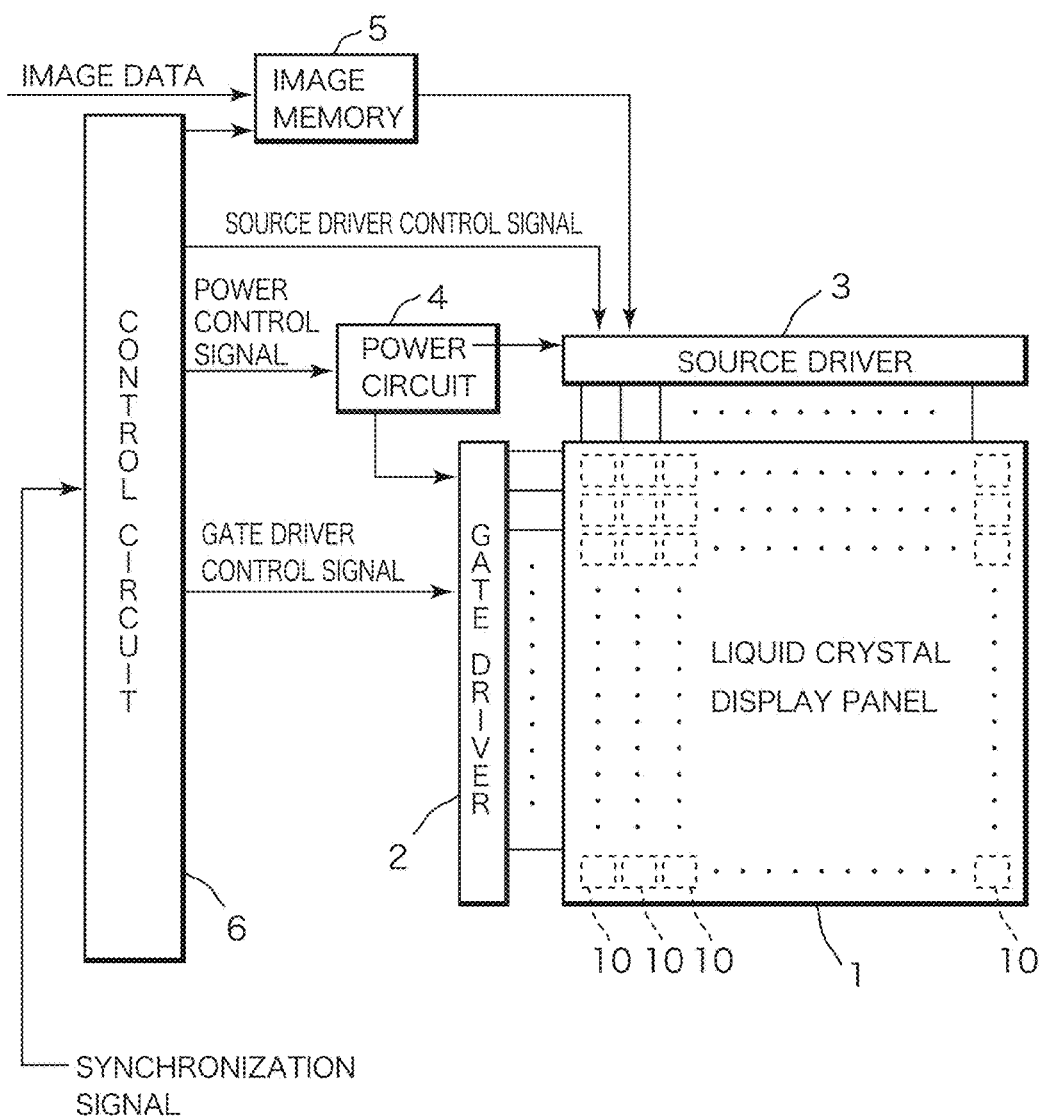
FIG. 8 is a schematic view illustrating a configuration of a driving system of a liquid crystal display apparatus.

Next, a configuration of a liquid crystal display apparatus using the liquid crystal display panel according to the present embodiment will be described. FIG. 8 is a schematic view illustrating a configuration of a driving system of the liquid crystal display apparatus. The display apparatus according to the present embodiment is, for example, a liquid crystal display apparatus including a liquid crystal display panel 1, a gate driver 2, a source driver 3, a power circuit 4, an image memory 5, a control circuit 6 and the like.

The liquid crystal display panel 1 includes a plurality of display elements 10, 10, 10, . . . disposed in a matrix manner. The display elements adjacent to each other are light shielded by the black matrix 151, and each of the display elements 10 is divided by the same, so as to respectively serve as a display pixel.

Each of the display elements 10 in the liquid crystal display panel 1 includes a pixel electrode provided in the TFT side glass substrate 110, a counter electrode 131 provided in the CF side glass substrate 130, and a liquid crystal layer 120 sealed between the pixel electrode and the counter electrode 131. The control circuit 6 controls the magnitude of a voltage applied to each display element 10 through the gate driver 2 and the source driver 3, so as to control light transmittance of the liquid crystal layer 120 in each of the display elements 10, and determine display luminance in each display pixel.

In order to control the voltage applied to the liquid crystal layer 120 in each display element 10, the control circuit 6 generates a memory control signal, a power control signal, a source driver control signal, and a gate driver control signal based on a synchronization signal input from an outside, and outputs each of the generated control signals to the image memory 5, the power circuit 4, the source driver 3, and the gate driver 2, respectively.

The image memory 5 temporarily stores input display data and outputs pixel data to be displayed on the liquid crystal display panel 1 to the source driver 3, in synchronization with the memory control signal input from the control circuit 6. Furthermore, the image memory 5 may be embedded in the control circuit 6, and may be configured to output image data to the source driver 3 through internal processing of the control circuit 6.

Herein, the input synchronization signal and the display data are included in an LCD signal output from a CPU or an LCD control IC equipped in a mobile phone, a portable game machine, or the like, a signal acquired by A/D converting a CRT output signal of a personal computer (PC), a signal acquired by allowing the control circuit 6 to directly control a video RAM equipped in the PC or the like.

The power circuit 4 generates a driving voltage for the gate driver 2, and a driving voltage for the source driver 3, in synchronization with the power control signal input from the control circuit 6, and outputs the generated driving voltage to the gate driver 2 and the source driver 3, respectively.

The gate driver 2 sequentially outputs a control voltage for controlling the switching element provided in the display element to be turned on/off, in synchronization with the gate driver control signal input from the control circuit 6, to apply it to the gate wiring 21 which is a scanning line.

The source driver 3 receives the pixel data output from the image memory 5, in synchronization with the source driver control signal input from the control circuit 6, and sequentially outputs a signal voltage depending on the pixel data. The signal voltage output from the source driver 3 is supplied to the display element 10 through the source wiring 31 which is the signal line, when the corresponding switching element is turned on.

Embodiment 2

In Embodiment 1, it is configured to provide the repair wiring 60 intersecting the cross wiring 521 in the meander wiring part 52 at at least two locations, but it may be configured that the repair wiring 60 is disposed so that a partial section thereof is overlapped with the parallel wiring 522.

In Embodiment 2, a configuration in which the repair wiring 60 is disposed so that a partial section thereof is overlapped with the parallel wiring 522 of the meander wiring part 52 will be described.

Figure 9:
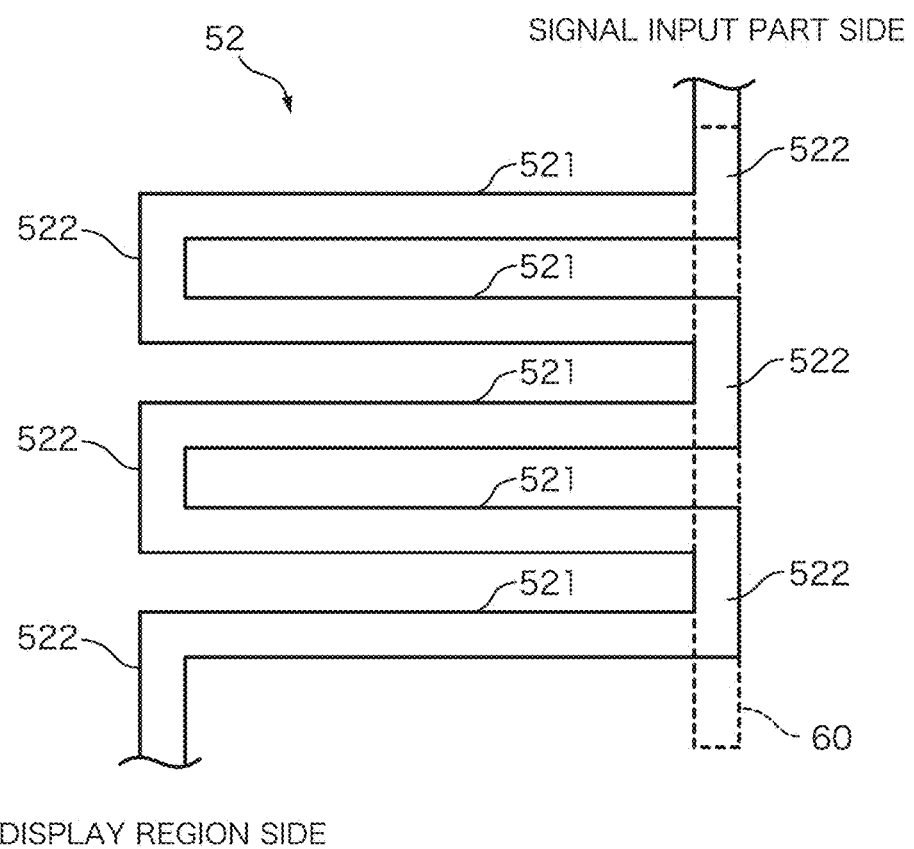
FIG. 9 is a schematic view describing a configuration of a repair wiring in Embodiment 2.

FIG. 9 is a schematic view describing a configuration of the repair wiring 60 in Embodiment 2. In a plane view, the repair wiring 60 is disposed so as to intersect the wiring in the meander wiring part 52 at at least two locations. In Embodiment 2, further, the repair wiring 60 is disposed so that a partial section thereof is overlapped with the wiring of the meander wiring part 52. In an example illustrated in FIG. 9, the repair wiring 60 is disposed at a right end of the meander wiring part 52, so that a partial section of the repair wiring 60 is overlapped with the parallel wiring 522 in the meander wiring part 52.

Also in Embodiment 2, since the repair wiring 60 is disposed so as to intersect the wiring in the meander wiring part 52 at at least two locations, when a disconnection occurs in the meander wiring part 52, a molten-rectifying is performed at these cross parts, and thereby it is possible to provide a bypass path, and repair the disconnection.

In addition, as compared to Embodiment 1, in the lead-out wiring part 50, it is possible to increase a region (an opening region) with no wiring formed therein. Therefore, for example, in an aspect in which ultraviolet (UV) rays are exposed from the other surface side of the TFT side glass substrate 110, so as to cure a seal material for sealing the liquid crystal material between the TFT side glass substrate 110 and the CF side glass substrate 130, it is possible to prevent an occurrence of an uncured part in the seal material.

Embodiment 3

In Embodiments 1 and 2, it is configured to provide one repair wiring 60 with respect to one meander wiring part 52, but it may be configured to provide a plurality of repair wirings 60.

In Embodiment 3, a configuration of providing a plurality of repair wirings 60 will be described.

Figure 10:
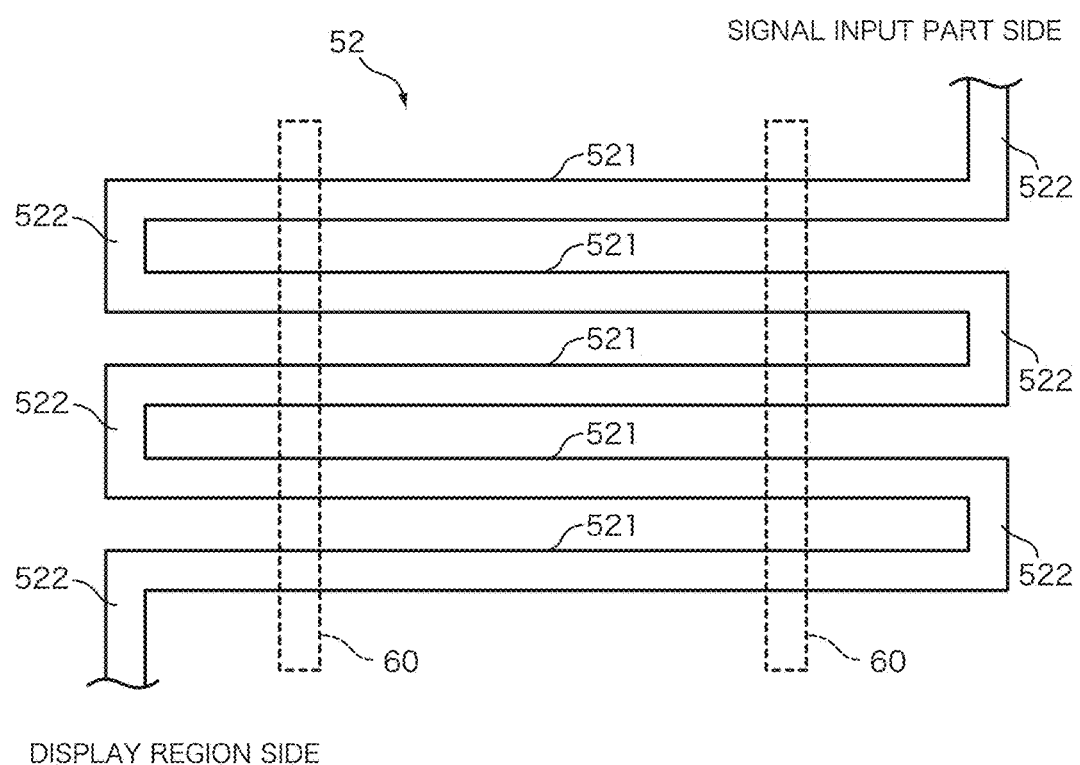
FIG. 10 is a schematic view describing a configuration of a repair wiring in Embodiment 3.

FIG. 10 is a schematic view describing a configuration of the repair wirings 60 in Embodiment 3. In an example illustrated in FIG. 10, two repair wirings 60 are provided with respect to the meander wiring part 52. Each of the repair wirings 60 is disposed so as to intersect the wiring in the meander wiring part 52 at at least two locations, in a plane view.

Figure 11:
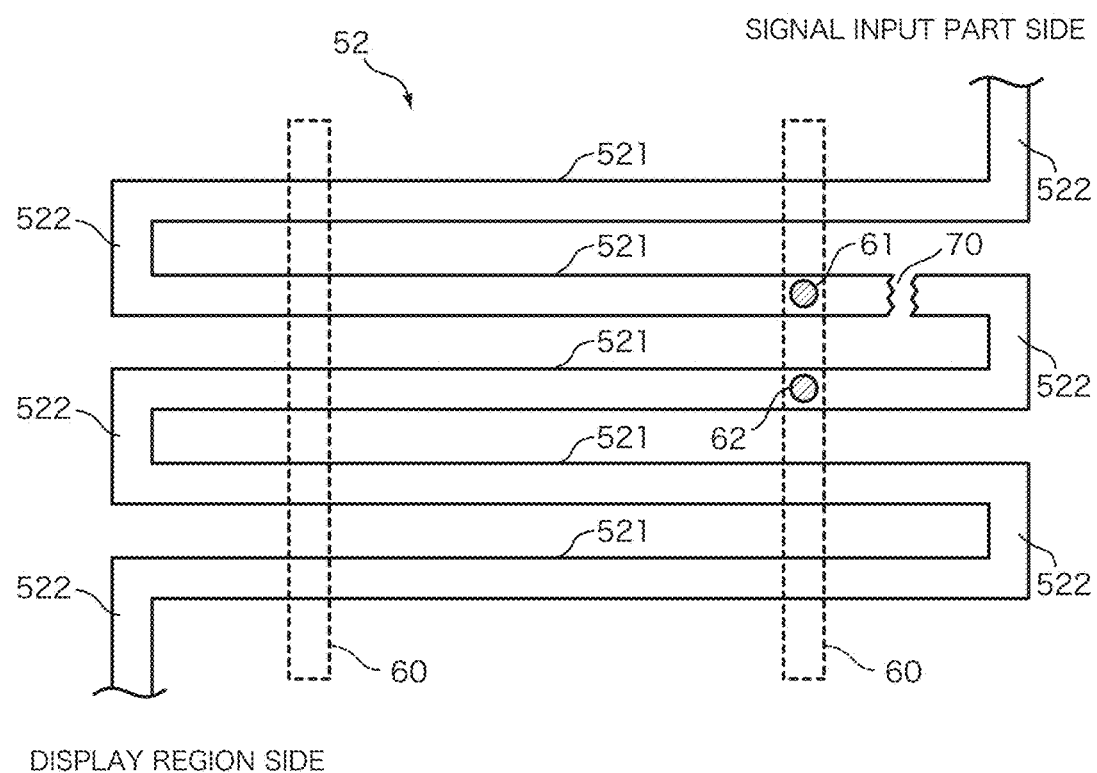
FIG. 11 is a schematic view describing a method for repairing the disconnection in Embodiment 3.

FIG. 11 is a schematic view describing a method for repairing the disconnection in Embodiment 3. In an example illustrated in FIG. 11, a state in which a disconnection location 70 occurs at the second cross wiring 521 from the signal input part 40 side is illustrated. In this case, a cross part 61 between a right repair wiring 60 close to the disconnection location 70 and the second cross wiring 521 from the signal input part 40 side, and a cross part 62 between the right repair wiring 60 and the third cross wiring 521 from the signal input part 40 side are molten-rectified, and thereby it is possible to provide a bypass path using the right repair wiring 60.

When an amplitude of the meander wiring part 52 is large (when the cross wiring 521 is long), even when the disconnection is repaired using the repair wirings 60, the wiring length after the repair is largely changed from the wiring length before the disconnection depending on the disconnection location 70, such that a change in a resistance of the lead-out wiring thereof may be more remarkable. However, in Embodiment 3, since the plurality of repair wirings 60 are disposed, the disconnection repair is performed by selecting the repair wiring 60 nearest to the disconnection location 70, and thereby it is possible to suppress a change in the resistance after the repair.

Further, in the example illustrated in FIG. 10, it is configured to provide two repair wirings 60 with respect to one meander wiring part 52, but it may be configured to provide three or more repair wirings 60. Furthermore, in the meander wiring part 52, as the disconnection may easily occur at corner portions in which the cross wiring 521 and the parallel wiring 522 are connected with each other, it is preferable that the repair wiring 60 is disposed in the vicinity of the corner portions.

Embodiment 4

In Embodiment 3, it is configured to provide the plurality of repair wirings 60 intersecting the cross wiring 521 in the meander wiring part 52 at at least two locations, but it may be configured to provide a connection wiring for connecting the plurality of repair wirings 60.

In Embodiment 4, a configuration of providing the connection wiring between the repair wirings 60 will be described.

Figure 12:
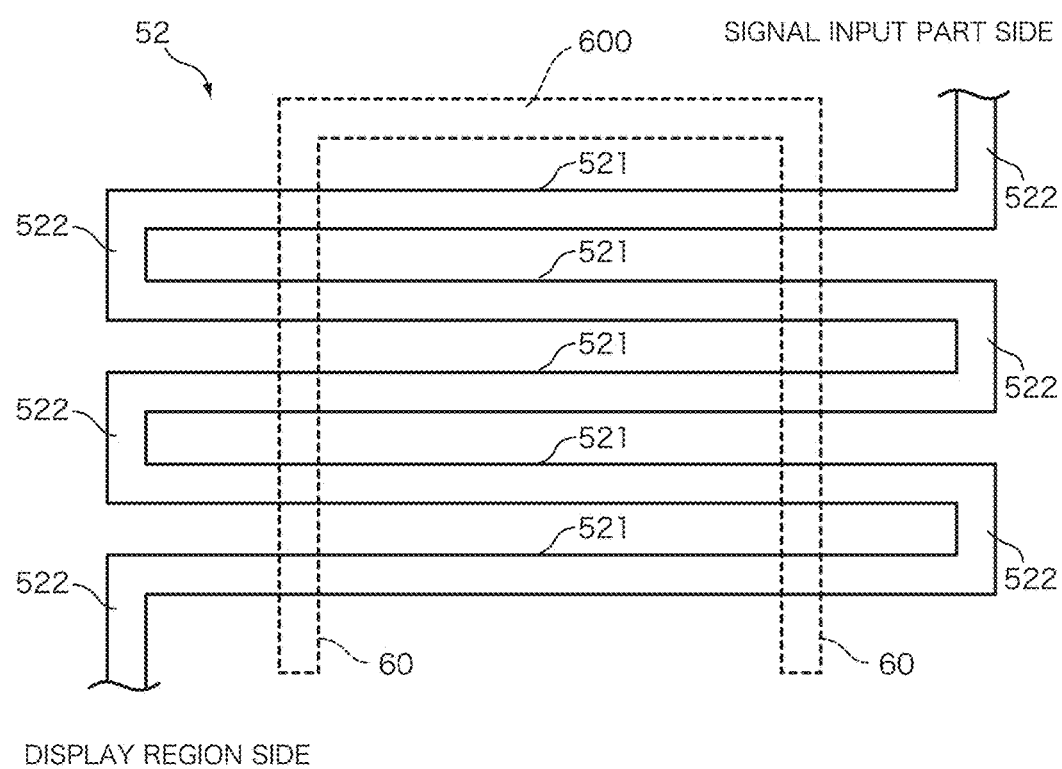
FIG. 12 is a schematic view describing a configuration of a repair wiring in Embodiment 4.

FIG. 12 is a schematic view describing a configuration of the repair wirings 60 in Embodiment 4. In an example illustrated in FIG. 12, two repair wirings 60 are provided with respect to one meander wiring part 52. Each of the repair wirings 60 is disposed so as to intersect the wiring in the meander wiring part 52 at at least two locations, in a plane view. Further, a connection wiring part 600 intersecting the two repair wirings 60 and 60 is provided, to connect the two repair wirings 60 and 60. The two repair wirings 60 and 60 and the connection wiring part 600 may be integrally formed.

Figure 13:
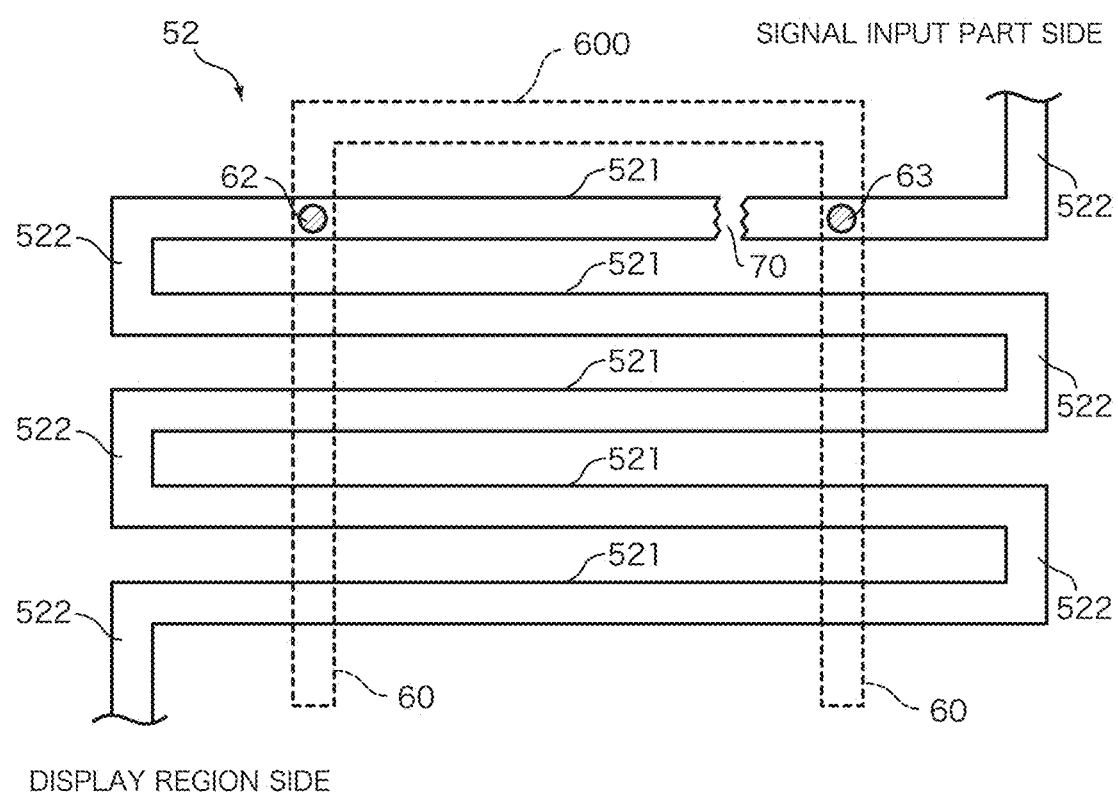
FIG. 13 is a schematic view describing a method for repairing the disconnection in Embodiment 4.

FIG. 13 is a schematic view describing a method for repairing the disconnection in Embodiment 4. In an example illustrated in FIG. 13, a state in which a disconnection location 70 occurs at a first cross wiring 521 from the signal input part 40 side is illustrated. In this case, on both sides of the disconnection location 70, a cross part 63 between a right repair wiring 60 and the first cross wiring 521 from the signal input part 40 side, and a cross part 64 between a left right repair wiring 60 and the first cross wiring 521 from the signal input part 40 side are molten-rectified, and thereby it is possible to provide a bypass path using the connection wiring part 600.

In Embodiment 4, the wiring length before the disconnection and the wiring length after the repair may be substantially the same as each other, and thereby it is possible to maintain a difference in a resistance between the lead-out wirings adjacent to each other within a predetermined range.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims. In addition, technical features described in each embodiment may be combined with each other, and new technical features may be formed by the combination.

It is noted that, as used herein and in the appended claims, the singular forms "a", "an", and "the" include plural referents unless the context clearly dictates otherwise.

The invention claimed is:

1. A display panel comprising:
    a plurality of display elements disposed in a display region in a matrix manner;
    signal input parts to which signals to be supplied to the plurality of display elements are input;
    a plurality of signal wirings which connect the plurality of display elements and the signal input parts, wherein at least a part of the signal wirings is provided with a meander wiring part whose wiring is meandered;
    a repair wiring for repairing disconnection at the meander wiring part; and
    an insulation layer which is provided between the signal wiring and the repair wiring,
    wherein the meander wiring part comprises:
        a plurality of parallel wiring parts which are provided substantially parallel to a portion of the signal wirings in the display region; and
        a plurality of cross wiring parts which extend in a second direction intersecting a first direction in which the parallel wiring part extends and are aligned along the first direction,
    wherein the plurality of parallel wiring parts includes:
        two or more first parallel wiring parts which connect first end potions on one side in the second direction at two adjacent cross wiring parts; and
        one or more second parallel wiring parts which connect second end portions on the other side in the second direction at two adjacent cross wiring parts, and
    wherein the repair wiring is disposed so as to overlap with the first parallel wiring parts and not to overlap with any of the second parallel wiring parts and the cross wiring parts.

2. The display panel according to claim 1, wherein the meander wiring part is provided so that a difference in a resistance value between the plurality of signal wirings becomes a value within a predetermined range.

3. The display panel according to claim 1, wherein a plurality of repair wirings are provided with respect to one meander wiring part.

4. The display panel according to claim 3, further comprising a connection wiring part which connects the plurality of repair wirings.

5. The display panel according to claim 1, wherein the display element is a liquid crystal display element, and
   the signal wirings are a source wiring configured to supply a display signal to the liquid crystal display element, and a gate wiring configured to supply a scanning signal for selecting the liquid crystal display element to be supplied with the display signal.

6. The display panel according to claim 5, wherein the insulation layer is provided between a source wiring layer including the source wiring and a gate wiring layer including the gate wiring, and
   at least one of the source wiring layer and the gate wiring layer is provided with the repair wiring.

7. A display apparatus comprising:
   the display panel according to claim 1; and
   a driving unit configured to drive the plurality of display elements included in the display panel.

8. The display apparatus according to claim 7, wherein the meander wiring part is provided so that a difference in a resistance value between the plurality of signal wirings becomes a value within a predetermined range.

9. The display apparatus according to claim 7, wherein a plurality of repair wirings are provided with respect to one meander wiring part.

10. The display apparatus according to claim 9, further comprising a connection wiring part which connects the plurality of repair wirings.

11. The display apparatus according to claim 7, wherein the display element is a liquid crystal display element, and the signal wirings are a source wiring configured to supply a display signal to the liquid crystal display element, and a gate wiring configured to supply a scanning signal for selecting the liquid crystal display element to be supplied with the display signal.

12. The display apparatus according to claim 11, wherein the insulation layer is provided between a source wiring layer including the source wiring and a gate wiring layer including the gate wiring, and
   at least one of the source wiring layer and the gate wiring layer is provided with the repair wiring.

13. The display panel according to claim 1, wherein the repair wiring overlaps with each of the two or more first parallel wiring parts.

14. The display panel according to claim 13, wherein the first end portions of the plurality of the cross wiring parts are aligned in the first direction, and the repair wiring is a linear shape extending in the first direction.

15. The display panel according to claim 14, wherein a width of the repair wiring in the second direction is substantially a same as a width of each of the two or more first parallel wiring parts in the second direction.

16. The display panel according to claim 1, wherein a width of the repair wiring in the second direction is substantially a same as a width of each of the two or more first parallel wiring parts in the second direction.

* * * * *